United States Patent [19]

Barger

[11] 4,428,833
[45] Jan. 31, 1984

[54] SPENT FLAKE DRAINER-CONVEYOR

[75] Inventor: William M. Barger, Piqua, Ohio

[73] Assignee: The French Oil Mill Machinery Co., Piqua, Ohio

[21] Appl. No.: 395,752

[22] Filed: Jul. 6, 1982

[51] Int. Cl.³ ............................................. B01D 23/20
[52] U.S. Cl. ................................. 210/113; 422/267; 422/273; 210/400
[58] Field of Search ............... 210/111, 113, 511, 400, 210/401, 198.1, 216, 383; 422/261, 198, 267, 269, 271, 273; 34/27, 35, 86; 423/578

[56] References Cited

U.S. PATENT DOCUMENTS

| 889,159 | 5/1908 | Trump | 422/267 |
|---|---|---|---|
| 1,940,585 | 12/1933 | Fauth | 422/271 |
| 2,545,938 | 3/1951 | Bilbe | 422/273 |
| 2,550,947 | 5/1951 | Straight | 422/267 |
| 2,614,911 | 10/1952 | Bonotto | 422/267 |
| 2,731,456 | 1/1956 | Weedman | 422/273 |
| 2,806,770 | 9/1957 | Hutchins et al. | 422/273 |
| 2,853,405 | 9/1958 | Heinrich | 422/273 |
| 2,954,790 | 10/1960 | Kaether | 422/269 |
| 4,079,010 | 3/1978 | Killeen et al. | 210/400 |
| 4,330,946 | 5/1982 | Courneya | 34/35 |
| 4,332,092 | 6/1982 | Hansotte | 34/27 |

Primary Examiner—Charles N. Hart
Assistant Examiner—Wanda L. Millard
Attorney, Agent, or Firm—Biebel, French & Nauman

[57] ABSTRACT

A spent flake drainer-conveyor for transferring spent flakes from a solvent extraction apparatus to a desolventizer-toaster apparatus, having a closed vapor tight housing extending from the desolventizer-toaster to the solvent extraction apparatus. A drainage section is formed in the housing and contains a screen section through which the flakes are moved. A vacuum source is attached to the drainage section causing a pressure differential across the screen in order to assist in separation of solvent from the flakes as they pass through the screen. A motor torque monitoring device is associated with the drive motor of the picker in the solvent extraction apparatus to provide an indication of the level of flakes in the trough portion of the solvent extraction apparatus. A variable speed drive and a motor speed control associated with the torque monitoring equipment controls the rate of movement of the conveyor so that the level of flakes in the trough portion of the solvent extraction apparatus can be maintained at a desired level through adjusting the rate of movement of the conveyor.

7 Claims, 5 Drawing Figures

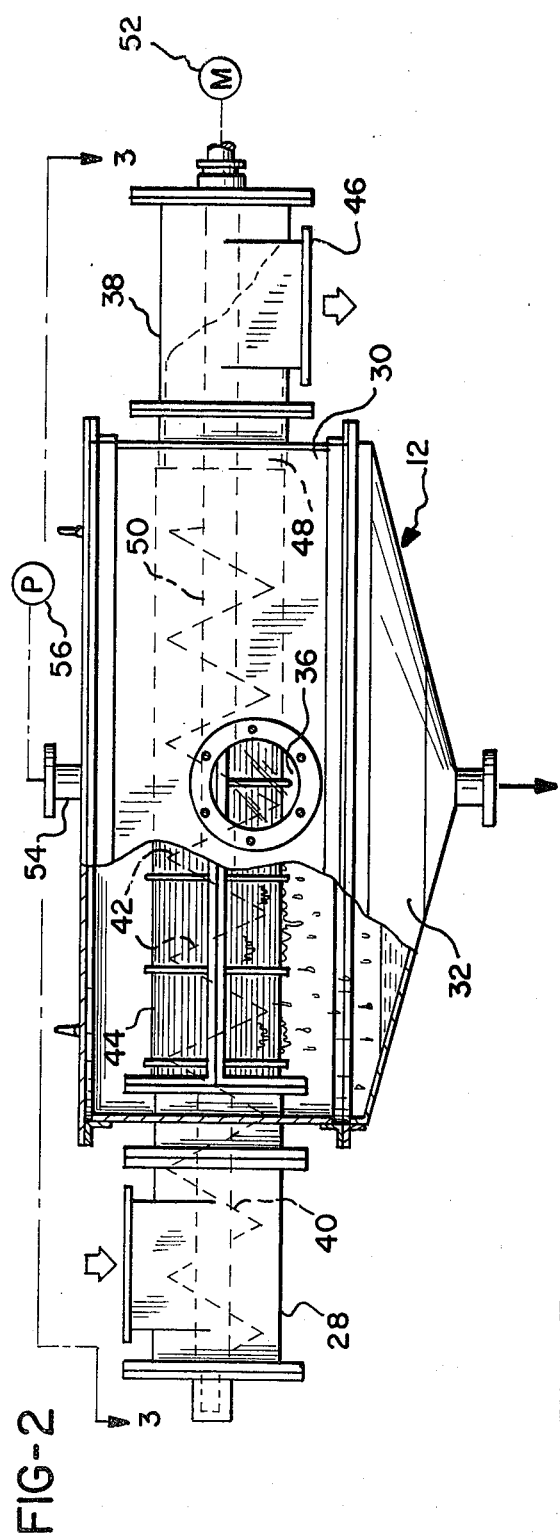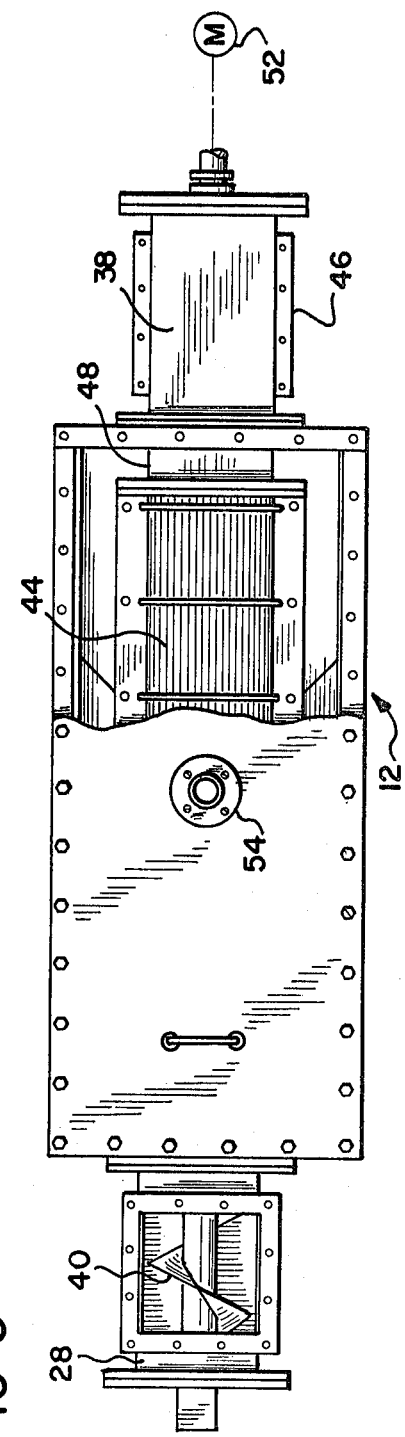
FIG-2
FIG-3

SPENT FLAKE DRAINER-CONVEYOR

BACKGROUND OF THE INVENTION

1. Field of the Invention

The present invention relates to the removal of solvents, such as hexane and the like, from flakes such as soybean flakes or cottonseed flakes or other oil bearing seeds, nut, animal tissue etc. The invention relates more particularly to a drainer-conveyor for transferring spent flakes from a solvent extraction apparatus to a desolventizer-toaster apparatus in a flake material processing system.

2. Prior Art

It is known to use a screw-type or en masse continuous chain conveyor to transfer the spent flakes coming from the lower portion of a solvent extraction apparatus to a desolventizer-toaster apparatus for subsequent processing to remove the solvent from the flakes which was picked up in the solvent extraction process. It is also known to provide a drainer section in the conveyor in order to permit the solvent to drain from the flakes as it is passing from the solvent extraction apparatus to the desolventizing toaster apparatus. It is advantageous to remove as much solvent as possible from the flakes prior to their entering the desolventizer-toaster apparatus so that less energy is required to evaporate the solvent and remove it from the flakes during processing in the desolventizer-toaster apparatus, prior to its subsequent processing.

In order to enhance the drainage of solvent from the flakes in the drainer section of the conveyor extending from the solvent extraction apparatus to the desolventizer-toaster apparatus, a negative pressure or vacuum has been applied to the drainer section of the conveyor to attempt to draw out additional solvent prior to passing the flakes into the desolventizer-toaster. A difficulty encountered, however, is that unless a solid mass of flakes is maintained in the conveyor from the drainer section towards the desolventizer-toaster as well as towards the solvent extraction apparatus, the negative pressure tends to draw solvent and moisture from either of these apparatus back into the flakes thus defeating the purpose and advantage of the drainer section in reducing the solvent that needs to be removed in the desolventizer-toaster. The occurrence of openings passing through the conveyors is random and not continuous and as a result produces nonuniformity in the removal of solvent. In order to overcome this problem it is necessary to maintain a certain level of flakes in the collecting trough beneath the solvent extraction apparatus and, likewise, to maintain a blockage or complete filling of the conveyor from the drainer section to the desolventizer-toaster.

SUMMARY OF THE INVENTION

The present invention overcomes the disadvantages and difficulties associated with the above described prior art devices and produces the advantageous results of permitting a negative pressure to be applied to the drainer section to remove a maximum amount of solvent from the flakes prior to entering the desolventizer-toaster, and also controls the level of flakes in the solvent extraction apparatus as well as in the conveyor so that no openings extend from the low pressure region in the drainer section of the conveyor to either the solvent extraction apparatus or the desolventizer-toaster apparatus.

These advantages are accomplished through the provision of a closed conveyor system with a drainage section in which a screening section is provided through which the flakes are passed and a pressure differential is created across the screen to enhance the migration of solvent from the flakes into the drainer section. A picker or similar device located in the lower region or collecting trough of the solvent extraction apparatus is driven by a motor whose power consumptions are constantly monitored to provide an indication of the level of the flakes accumulated in the trough. The conveyor section downstream from the drainer section and which dumps into the desolventizer-toaster, is provided with a variable speed drive motor and control which is interconnected to the picker drive motor power monitor so as to vary the speed of movement of the conveyor in a predetermined manner in response to changes in torque on the picker drive motor. This maintains a predetermined level of flakes in the trough and prevents openings from occuring in the conveyor section extending towards the desolventizer-toaster.

BRIEF DESCRIPTION OF THE DRAWINGS

FIG. 2 is an enlarged elevational view of the drainage section of the conveyor portion of the preferred embodiment of FIG. 1;

FIG. 3 is a plan view of the drainage section illustrated in FIG. 2;

DETAILED DESCRIPTION OF THE PREFERRED EMBODIMENTS

Figure 1:
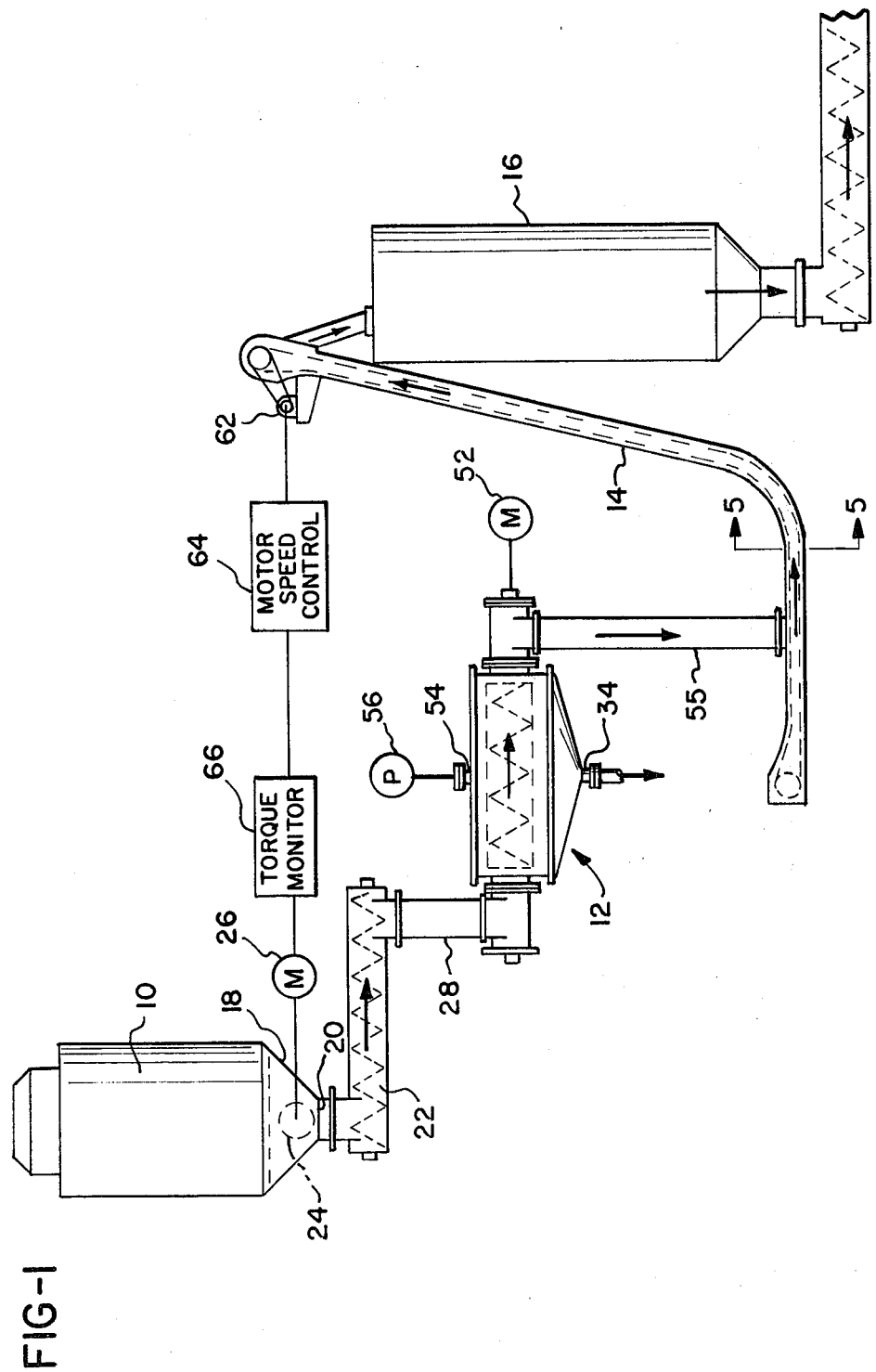
FIG. 1 is a somewhat schematic elevational view of a portion of a material processing system which illustrates a first preferred embodiment of the present invention.

Referring to FIG. 1, illustrated is that portion of a total material processing system which is relevant to the present invention. Although it is not necessary in order to understand the present invention that a detailed analysis be made of the entire system, an example of such a system is provided by Hutchins et al. U.S. Pat. No. 2,806,770.

In FIG. 1 are illustrated the main components of such a system which are associated with the present invention. These include a solvent extraction apparatus 10, a solvent drainage section 12, a continuous chain en masse conveyor 14 and a desolventizer-toaster 16.

The internal structure and operation of the solvent extraction apparatus 10 is not particularly relevant to the present invention and is well known in the prior art. Generally, however, the flake material being processed through the solvent extraction apparatus 10 is dumped into a trough 18 at the lower portion of the solvent extraction apparatus where it tends to accumulate prior to being removed for subsequent processing. Commonly connected to the reduced area portion 20 of the trough 18 is a screw-type conveyor 22 which conveys the flake material to another location for subsequent processing.

Since the flake material which collects in the trough 18 is moist from the solvent which it has absorbed during processing in the solvent extraction apparatus 10, it tends to pack solidly and bridge the reduced area portion 20 so as not to pass into the conveyor 22. In order to eliminate this problem a device commonly referred to as a picker 24 is generally utilized. The picker 24 is constructed with an open frame work to permit the flakes to pass through it and is positioned in the trough close to the reduced area portion 20. The picker 24 is mounted for rotation on a central drive shaft which is driven by a motor 26. Rotation of the picker 24 keeps the flakes in the trough 18 sufficiently agitated to permit them to fall into the conveyor 22 and thus be conveyed for subsequent processing.

In the present invention, the flakes are conveyed by the screw-type conveyor 22 to an input pipe 28 which introduces the flakes into the drainage section 12. The drainage section 12 is best illustrated in FIGS. 2 and 3 and generally consist of a vapor tight housing 30 which includes a solvent collection pan 32 that empties into a solvent outlet line 34 from which it is conveyed back to the solvent extraction apparatus 10 for reuse, or could be disposed of if desired. A sight glass 36 is formed in the side of the housing 30 so that activity within the drainage section 12 can be visually monitored. The input pipe 28 is connected to the input side of the housing 30 and an outlet pipe 38 is connected to an outlet side of the housing 30.

Extending from inside the input pipe 28 and through the housing to a point adjacent the outlet pipe 38 is another screw-type conveyor 40. The flights 42 of the conveyor 40 within the housing 30 are contained within a cylindrical cage 44 formed preferably of wedge wire screen or the like which permits drainage of solvent from the flakes being conveyed through this section so that the solvent can empty into the collection pan 32. At the output end of the screw conveyor 40 the flights 42 are terminated short of the down pipe 46 on the outlet pipe 38 in order that the material being processed develops a plug extending from the end of the last flight 42 to the down pipe 46. This is to assist in preventing solvent from passing back into the housing 30 from the output side. A solid cylindrical sleeve 48 mates with the end of the cylindrical screen 44 to receive the material at the end of flights 42. The screw-type conveyor 40 is driven through a central shaft 50 extending through both the input and output pipes 28 and 38, and is driven by motor 52.

As illustrated in FIGS. 2 and 3, opening into the top of the housing 30 is a suction pipe 54 to which can be applied a reduced pressure to produce a reduced pressure within the housing 30. Reduced pressure applied to the suction pipe 54 can be created by any one of several means such as the vacuum pump 56 illustrated, or a steam ejector could also be utilized.

By applying a reduced pressure to the housing 30 the flake material being processed as it passes through the cylindrical screen 44 tends to give up a greater amount of solvent than it would otherwise do without the application of this negative pressure to the housing 30. Thus, the subsequent energy required to cook off the solvent in the desolventizer-toaster is reduced and results in an energy savings.

Figure 5:
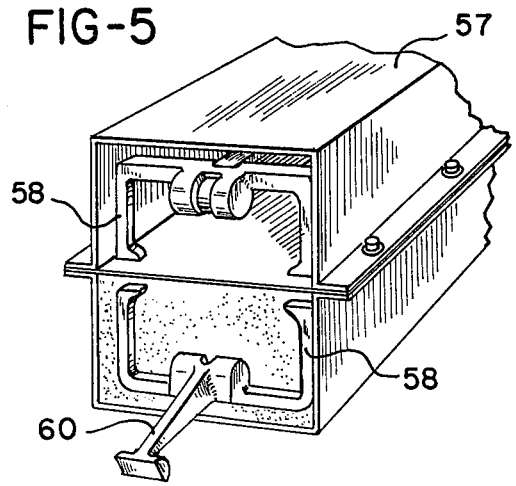
FIG. 5 is an enlarged sectional view through line 5—5 of FIG. 1.

Referring again to FIG. 1, after the flake material has left the drainage section 12 through the outlet pipe, it is passed through a pipe 55 into the conveyor 14. In the first preferred embodiment illustrated in FIG. 1, conveyor 14 is a continuous chain-type conveyor such as the Redler coonveyor available from Stephens-Adamson Division of Borg-Warner Corp., Aurora, Ill. A cross section of the conveyor 14 is illustrated in FIG. 5 and shows that the material is slowly moved through a vapor-tight housing 57 by passing paddles 58, which form the continuous chain 60, through the material dumped into the conveyor 14 at the base of the pipe 56. The material is thus conveyed in this manner to the top of the desolventizer-toaster 16.

As shown in FIG. 1, the en masse conveyor 14 has its continuous chain driven by a motor 62 mounted adjacent the output end of the conveyor. Motor 62 is a variable speed motor which permits adjustment of the rate of movement of the paddles 58 within the conveyor housing. A motor speed control 64 is provided to control the speed of motor 62 in accordance with predetermined rates of desired speed of movement of the paddles 58 in order to cause the flakes to be moved at a desired rate through the conveyor 14 to maintain a solid mass of material as a plug to prevent solvent vapors from passing back through the conveyor from the desolventizer-toaster apparatus 16.

Part of the system includes a amperage monitoring circuit, referred to in FIG. 1 as the torque monitor 66, which essentially monitors the amperage use of the motor 26 used to drive the picker 24. Such a system of motor speed control and monitoring equipment for controlling the motor 62 to get the appropriate rate of movement of material in the conveyor 14 is provided by a static output servo amplifier, AD-8800 series, available from Foxboro/Jordan Inc. of Milwaukee, Wis.

Thus, an increase in the level of feed material in the trough 18 will cause a requirement for an increase in power from the motor 26 which will be indicated by an increase in amperage and this is monitored by the torque monitor 66. An increase in the level of flakes of trough 18 will thus result in an increased rate of movement of the flake material in the en masse conveyor 14 through the interconnection of the motor speed control 64 and torque monitor 66. Likewise, as the level of flakes in the trough 18 decreases, the torque required will decrease and the rate of movement of the flakes within the conveyor 14 can be likewise decreased accordingly through the interconnection of the motor speed control 64 and torque monitor 66. Keeping the level of flakes in the trough 18 relatively constant thus prevents an opening from the solvent extraction apparatus 10 into the drainage section 12, which, due to the reduced pressure therein would otherwise cause solvent vapor to be drawn into the drainage section reducing the effectiveness of the solvent removal in that area.

Figure 4:
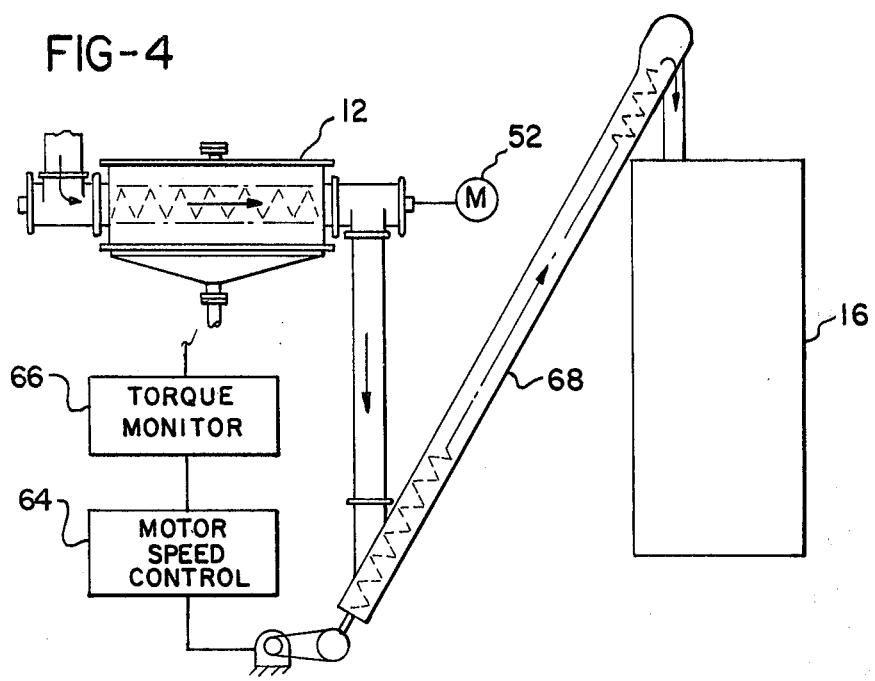
FIG. 4 is a second preferred embodiment of the present invention in which the continuous chain conveyor is replaced by a screw-type conveyor.

In FIG. 4 is shown an alternative embodiment of the system of FIG. 1 in which all of the components are identical except for the fact that the continuous chain en masse conveyor 14 has been replaced by a screw-type conveyor 68 which is considered a useful alternative to the en masse conveyor. The system illustrated in FIG. 4 is otherwise identical in operation and the torque monitor 66 and motor speed control 64 function in the same way as described with respect to the system of FIG. 1.

While the forms of apparatus herein described constitute preferred embodiments of this invention, it is to be understood that the invention is not limited to these precise forms of apparatus, and that changes may be made therein without departing from the scope of the invention.

What is claimed is:

1. A spent flake drainer-conveyor for transferring spent flakes from a solvent extraction apparatus to a desolventizer-toaster apparatus, comprising:

a closed, vapor-tight housing having an inlet opening defined therein connected to said solvent extraction apparatus for receiving spent flakes therefrom, an outlet opening defined therein connected to said desolventizer-toaster apparatus for introducing spent flakes thereinto, and at least one drainage section formed in said housing;

screen means in said drainage section of said housing past which said flakes move and through which only solvent will pass for separating solvent from said flakes;

means producing a pressure differential across said screen means for assisting in the separation of solvent from said flakes and passage through said screen means;

means for collecting said solvent after it has passed through said screen means;

means for conveying said flakes through said housing from said solvent extraction apparatus to said desolventizer-toaster apparatus; and means monitoring the level of flakes in said solvent extraction apparatus available to enter said inlet opening of said housing and for adjusting the rate of movement of said conveying means in order to maintain said level of flakes within predetermined limits.

2. A spent flake drainer-conveyor as defined in claim 1 wherein said screen means includes a cylindrical wedge wire screen; and
a screw conveyor disposed within said screen for conveying said flakes therethrough.

3. A spent flake drainer-conveyor as defined in claim 1 wherein said means for producing a pressure differential across said screen means includes a vacuum pump connected to said discharge section to draw solvent through said screen means.

4. A spent flake drainer-conveyor as defined in claim 3 wherein said means for collecting solvent is disposed beneath said screen.

5. A spent flake drainer-conveyor as defined in claim 1 wherein said means for conveying said flakes includes an endless driven chain and a plurality of conveying elements for producing continuous movement of said flakes through said housing.

6. A spent flake drainer-conveyor as defined in claim 1 wherein said means for conveying said flakes includes a screw-tupe conveyor for producing continuous movement of said flakes through said housing.

7. A spent flake drainer-conveyor as defined in claim 1 wherein said solvent extraction apparatus includes a flake collection trough in the lower portion thereof and a picker disposed beneath said trough and into which said spent flakes are deposited, said picker including a drive motor which causes said picker to continuously convey said spent flakes from said collection trough to said opening in said housing where they are picked up by said means for conveying said flakes through said housing; and said means for monitoring the level of flakes in said extraction apparatus monitors the power usage of said drive motor as an indication of the level of said flakes in said collection trough; and said means for conveying said flakes through said housing includes a variable speed drive motor to which said monitoring means is connected for adjusting the rate of movement of said conveying means to adjust the level of said flakes in said container accordingly.

* * * * *